Sept. 15, 1936.  E. OKUN  2,054,761
CORKSCREW
Filed March 9, 1934
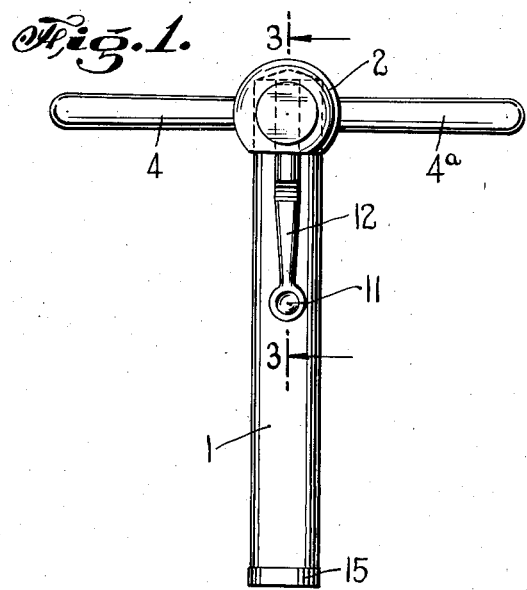
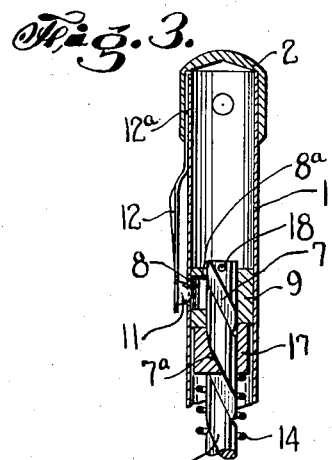
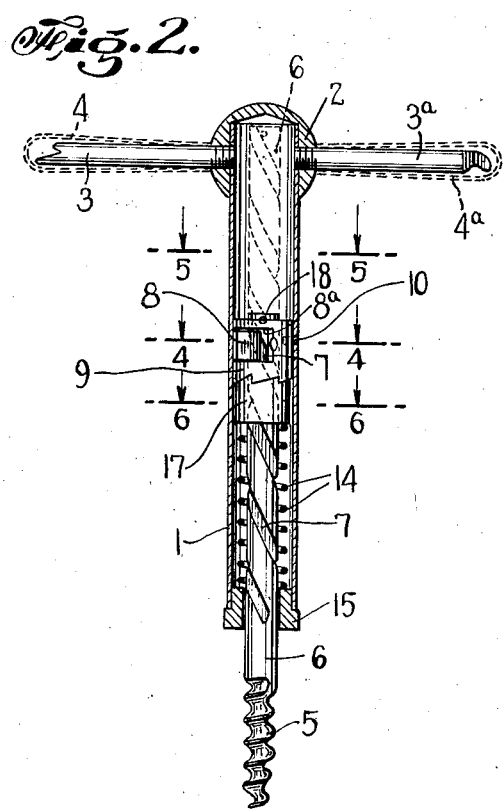
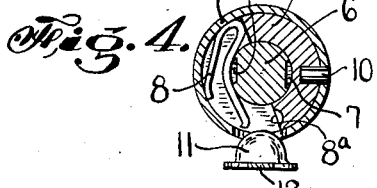
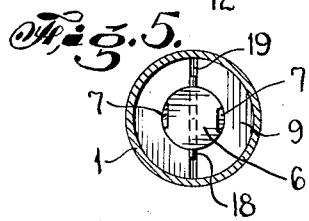
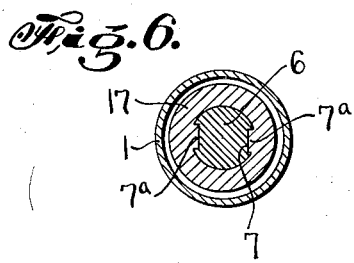
Edward Okun
INVENTOR.
BY Mock & Blum,
ATTORNEYS.

Patented Sept. 15, 1936

2,054,761

UNITED STATES PATENT OFFICE 2,054,761

CORKSCREW

Edward Okun, New York, N. Y., assignor to American Folding Umbrella Corporation, New York, N. Y., a corporation of New York Application March 9, 1934, Serial No. 714,794

2 Claims. (Cl. 65—50)

My invention relates to a new and improved corkscrew. One of the objects of my invention is to provide a corkscrew, in which the corkscrew member is inserted into the cork by means of a reciprocating movement of the device.

Another object of my invention is to provide a corkscrew, in which the shank of the corkscrew member is provided with a quick action thread.

Another object of my invention is to provide a corkscrew having an outer casing and a corkscrew member, together with means for enclosing the corkscrew member within the casing and holding it in such position, the device also having means for releasing the corkscrew member from the casing.

Other objects of my invention will be described in the following description and drawing, which illustrate a preferred embodiment thereof.

Fig. 1 is a front elevation.

Fig. 2 is a central sectional view in the plane of the paper.

Fig. 3 is a sectional view on the line 3—3 of Fig. 1.

Figs. 4, 5, and 6 are respectively sectional views on the lines 4—4, 5—5, and 6—6 of Fig. 2.

The device is provided with an outer casing 1, to which a handle head 2 is connected, by means of a drive fit or in any other suitable manner. Handle members 3 and 3a are connected to the head 2, by means of the inner threaded ends of said members 3 and 3a which pass into internally threaded openings of the head 2, and said internally threaded ends of the members 3 and 3a also enter the shell or casing 1. However the inner ends of said members 3 and 3a are flush with the inner wall of the casing 1.

The handle member 3 is provided with an outer end which is shaped, so as to act as a bottle-cap remover, and the outer end of the member 3a is shaped so as to act as a wire cutter. The handle members 3 and 3a are provided with outer removable sleeves 4 and 4a, which fit frictionally over said handle members 3 and 3a.

In Fig. 1 the corkscrew member is shown as being located within the casing 1, and in Fig. 2 the corkscrew member is shown as being in the outer and operative position.

The corkscrew member 5 is provided with a shank 6, and said shank 6 is provided with a steep thread 7. The thread 7 extends to the upper end of the shank 6.

A nut member 17 has teeth 7a which fit in the steep thread 7 of the shank 6. The upper end of the nut 17 is formed with ratchet teeth. The nut member 17 has its periphery spaced from the interior wall of the casing 1. A compression spring 14 abuts the under side of the nut 17. The lower end of the spring 14 abuts a collar 15, which has a drive fit in the bottom of the casing 1. The shank 6 passes slidably through said collar 15.

A block 9, which has the shape shown in Figs. 2 and 4, is fixed to the casing 1 by means of the pin 10.

The shank 6 passes through the block 9, and said block 9 has a cut-out portion or recess 8a, in which a spring 8 is located. The height of the recess 8a is less than the height of the block 9. The spring 8 presses against a part of the shank 6, so that the spring 8 serves to releasably retain the shank 6 within the casing 1, this being the position shown in Fig. 1.

The spring 8 can be moved so as to release the shank 6, by inwardly pressing a release button 11, which is mounted at the lower end of the shank 12. The shank 12 is made of any suitable resilient metal, and it is provided with a top portion 12a which fits into a groove or keyway which is formed in the head 2. The upper end of the portion 12a is bent over the top of the casing 1, so that the shank 12 is held in position.

The release button 11 can pass through a suitable opening which is provided in the adjacent part of the casing 1 so that the release button 11 can force the adjacent branch of spring 8 to the release position.

The underside of the collar 9 is provided with ratchet teeth which interfit with the ratchet teeth which are provided at the top of the nut 17. Such ratchet teeth are provided all along the adjacent surfaces of the block 9 and of the nut 17.

The operation of the device is as follows:

If it is assumed that the device shown in Fig. 2 is viewed from above, it is clear that quickthread 7 is a left-hand thread. The thread of corkscrew 5 is right-hand and its pitch is much smaller than that of thread 7. The button 11 can be pushed inwardly to release spring 8 from shank 6, and the shank 6 can then be moved inwardly to the inoperative position. During said inward movement, the shank 6 tends to turn nut 17 in the clockwise direction. The soft spring 14 permits the movement of nut 17.

When the device is to be used, the button 11 is pressed inwardly, and the device can be shaken until the shank falls into proper position. Button 11 is then permitted to move outwardly, so that spring 8 frictionally engages shank 6, as shown in Fig. 4.

The end of the corkscrew is now placed against the cork, and casing 1 is moved down, thus moving nut 17 and spring 8 and block 9 downwardly relative to shank 6.

The teeth 7a press against the walls of thread 7, producing a downward longitudinal pressure and causing shank 6 to turn against the friction produced by spring 8. The sliding frictional grip of spring 8 against shank 6, also forces shank 6 downwardly. The locking of the ratchet teeth prevents nut 17 from turning relative to block 9. Hence the downward movement of block 9 and of nut 17, relative to shank 6, will cause shank 6 to turn clockwise.

As shown in Fig. 2, the pitch of thread 7 is very much greater than the pitch of the thread of corkscrew 5. Hence nut 17 must move downwardly through a distance which is much greater than the corresponding length of movement of the corkscrew to enter the cork.

The longitudinal pressure exerted against the corkscrew by the device, is sufficient to cause the corkscrew to enter the cork.

At the completion of the first downward stroke of casing 1, the corkscrew is partially imbedded in the cork.

The casing 1 is now moved upwardly relative to the corkscrew. The sliding frictional grip of spring 8 is insufficient to pull the corkscrew out of the cork. The nut 17 is now free to turn clockwise, and its ratchet teeth slip along the ratchet teeth of block 9, yielding contact between said teeth being maintained by soft spring 14, which does not offer any substantial resistance to said slipping of the ratchet teeth. The upstroke of the casing must be sufficiently quick to prevent block 9 from pulling the corkscrew out of the cork.

After a few reciprocations of the casing 1, the corkscrew is sufficiently imbedded in the cork. The casing 1 can now be pulled up until block 9 and pins 18 cause the corkscrew to pull the cork out.

I claim:

1. A corkscrew device comprising a casing, a block located within said casing, and fixed to said casing, said block having a recess between the top and bottom edges thereof, a U-shaped spring located within said recess, a corkscrew member having a shank which passes through said fixed member, one of the branches of said U-shaped spring being adapted to frictionally hold said shank so that the corkscrew member can be retained within said casing, a release member movably connected to said casing, said casing having an opening through which said release member can be inwardly pushed so as to engage said spring and release it from said shank, said shank having a steep thread, a nut located on said steep thread and a spring located within said casing and adapted to press said nut against the under side of said fixed member.

2. A corkscrew device comprising a casing, a block located within said casing, and fixed to said casing, said block having a recess between the top and bottom edges thereof, a U-shaped spring located within said recess, a corkscrew member having a shank which passes through said fixed member, one of the branches of said U-shaped spring being adapted to frictionally hold said shank so that the corkscrew member can be retained within said casing, a release member movably connected to said casing, said casing having an opening through which said release member can be inwardly pushed so as to engage said spring and release it from said shank, said shank having a steep thread, a nut located on said steep thread and a spring located within said casing and adapted to press said nut against the under side of said fixed member, the adjacent surfaces of said nut and of said fixed member having ratchet teeth which are inclined in a direction opposite to the direction of inclination of said steep thread.

EDWARD OKUN.